United States Patent [19]

Andrews

[11] 4,245,846
[45] Jan. 20, 1981

[54] ONE-PIECE COLLET

[75] Inventor: Earl C. Andrews, Elgin, S.C.

[73] Assignee: Hardinge Brothers, Inc., Elmira, N.Y.

[21] Appl. No.: 902,246

[22] Filed: May 2, 1978

Related U.S. Application Data

[63] Continuation-in-part of Ser. No. 675,688, Apr. 9, 1976, abandoned.

[51] Int. Cl.³ ............................................. B23B 31/20
[52] U.S. Cl. ..................................... 279/46 R; 29/558; 76/101 R
[58] Field of Search ................... 279/1 ME, 4, 46–53; 408/59; 76/101 R, 102 A; 29/527.6, 557, 558

[56] References Cited

U.S. PATENT DOCUMENTS

| 1,498,450 | 6/1924 | Greve | 76/101 R |
|---|---|---|---|
| 1,870,970 | 8/1932 | Stevenson | 29/558 X |
| 1,968,700 | 7/1934 | Milotta | 279/4 |
| 2,886,007 | 5/1959 | Manchester | 279/4 X |
| 3,191,463 | 6/1965 | Ladendorf | 408/59 |
| 3,562,901 | 2/1971 | Ray | 29/558 |

Primary Examiner—Z. R. Bilinsky
Attorney, Agent, or Firm—Schlesinger, Arkwright, Garvey and Dinsmore

[57] ABSTRACT

A one-piece collet for use in machine tools, which collet comprises a rear portion which is cold worked to provide a bore of smaller diameter than the bore of the central portion of the collet, which reduced bore is threaded. The cold working of the rear portion produces a transitional area between the different sized bores of the rear and central portions which is characterized by a smooth, uniform grain flow, with unbroken flow lines, resulting in increased tensile strength and longer fatigue life of the collet. The front portion of the collet may also be cold worked to provide a similar transitional area between the central portion of the collet and the reduced bore of the front portion of the collet.

9 Claims, 12 Drawing Figures

ONE-PIECE COLLET

This application is a continuation-in-part of application Ser. No. 675,688 filed Apr. 9, 1976 now abandoned.

BACKGROUND OF THE INVENTION

Collets employed for use with Bridgeport-type milling machines have conventionally been made by drilling a uniform longitudinal bore through the rear and central portions of the collet, following which a bushing is inserted into the rear portion of the bore. The bushing has a threaded bore of reduced cross-sectional area for attachment to the milling machine. In the manufacture of this type of collet, production cost is increased since the assembly of the two parts of the collet is time-consuming. Additionally, it has been found that the two part assembly causes problems when used including, inter alia, the loosening of the bushing with use, difficulty in controlling optimum assembly procedures, and inability to maintain the concentricity of the bushing thread.

SUMMARY OF THE INVENTION

The present invention is directed to the provision of a one-piece collet which may be used for Bridgeport-type milling machines, as well as other machines, and in which the rear portion of the collet is cold worked to reduce the diameter of the longitudinal bore extending through the rear and central portions of the collet, the reduced bore being threaded for attachment to a machine tool.

By cold working the rear portion of the collet, the transitional area between the central and rear portions is characterized by a progressively thicker wall and a gradual reduction in the diameter of the longitudinal bore, producing a fine metallic grain structure and a smooth uniform grain flow of the metal with unbroken flow lines. This results in a collet of increased tensile strength of the entire draw bar end of the collet and increases fatigue life of the collet.

The threads in the rear portion bore are of a smoother finish and allow an easier and precisely centered pull by the draw bar on the collet, resulting in a tighter grip and less run out of the tools held by the front portion of the collet.

The present invention further contemplates a process for manufacturing collets in accordance with the present invention wherein the rear portion of the collet is cold worked by swaging, drawing or other suitable process to reduce the diameter of the bore of the rear portion, and wherein the process may also be employed for cold working the front portion of the collet to provide a reduced longitudinal bore of gradually decreasing diameter.

DESCRIPTION OF FIGURES OF THE DRAWINGS

In FIG. 1, there is illustrated a standard collet designated 20 which is particularly adapted for use with a Bridgeport-type milling machine. Collet 20 includes a generally cylindrical body including a front work-gripping portion 22, the outer surface of which is frusto-conical as indicated at 24 to provide a camming surface. Collet 20 further includes a central spring leaf portion 26 and a rear portion 28. Collet 20 is further provided with a longitudinal bore 30 of uniform cross-sectional area which extends through rear portion 28 and central spring leaf portion 26. A longitudinal bore 32 of reduced cross-sectional area extends axially through front portion 22.

A plurality of longitudinal slots 34 extend radially outwardly from bores 30 and 32 to the outer periphery of the collet, which slots extend through front portion 24 and a substantial part of central portion 26, thereby forming a plurality of resilient fingers or leaves.

Figure 1:
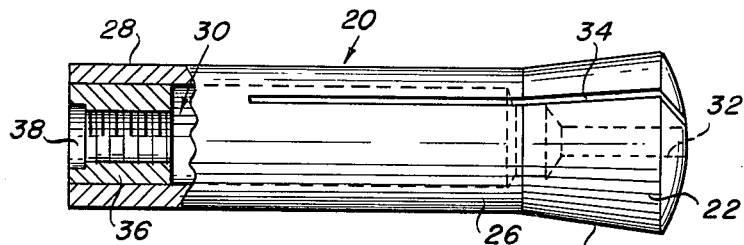
FIG. 1 is a side elevational view of a conventional collet, a portion thereof being broken away to disclose details of construction.

In order to adapt the collet of FIG. 1 for attachment to a Bridgeport-type milling machine, a bushing 36 is fitted in the bore of rear portion 28, which bushing is provided with a threaded bore 38 for engagement with the draw bar of the milling machine.

Figure 2:
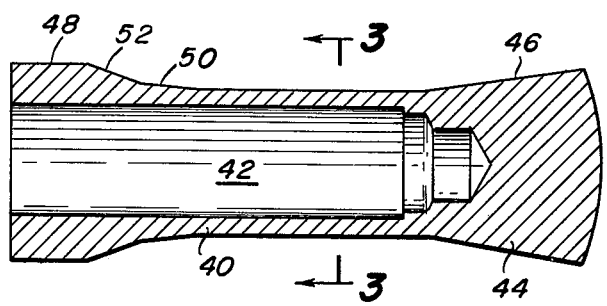
FIG. 2 is a longitudinal sectional view of a partially constructed collet made in accordance with the present invention.
Figure 3:
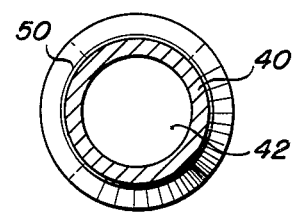
FIG. 3 is a sectional view taken along the line 3—3 of FIG. 2, looking in the direction of the arrows.

In accordance with the present invention, cylindrical stock of alloy steel, or other suitable metal, is machined, as shown in FIGS. 2 and 3 to provide a central body portion 40 having an enlarged longitudinal bore 42, the wall of which portion is of relatively thin, uniform thickness.

The forward end of central body portion 40 issues into a front portion 44 having a frusto-conical camming surface 46. At the aft end of central portion 40, the wall of the collet is progressively and gradually thickened through a transitional area of approximately ¾ inch of the collet length to a rear portion 48, the wall of which is approximately twice the thickness of the central portion wall.

As shown in FIG. 2, in the transitional area between central portion 40 and rear portion 48, the gradual increase in wall thickness is effected by means of a first peripheral, angular wall section 50, the outer surface of which extends outwardly and rearwardly at approximately a 5° angle to the outer wall surface of central portion 40. Peripheral angular wall section 50 issues into a second peripheral, angular wall section 52, the outer surface of which extends outwardly and rearwardly at approximately a 20° angle to the wall of central portion 40.

Figure 4:
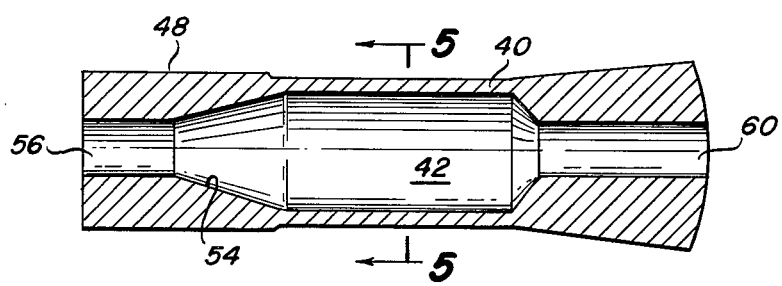
FIG. 4 is a longitudinal sectional view similar to FIG. 2, wherein the rear portion of the collet has been cold worked in accordance with the present invention.
Figure 5:
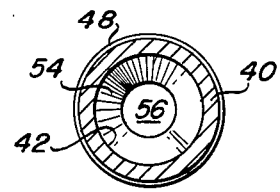
FIG. 5 is a sectional view taken along the line 5—5 of FIG. 4, looking in the direction of the arrows.

In accordance with the process of the present invention, rear portion 48 and transitional wall sections 50 and 52 are cold worked, i.e., plastically deformed below the recrystallization temperature of the metal, by swaging, drawing, or other suitable process, until the outer diameter of the rear portion is approximately the same as that of the central portion 40, as illustrated to advantage in FIGS. 4 and 5.

The thickness of the wall of the collet in the transitional area between the central and rear portions is thereby progressively and gradually increased to provide an angular wall section 54, extending for approximately ¾ inch of the collet length, the inner surface of which extends inwardly and rearwardly at approximately a 20° angle to the wall of central portion 40. Correspondingly, the diameter of the bore in the transitional area is progressively and gradually reduced. Beyond the transitional area, a longitudinal bore 56 of uniform cross-sectional area extends through rear portion 48, which bore is of substantially smaller cross-sectional area than bore 42.

Figure 6:
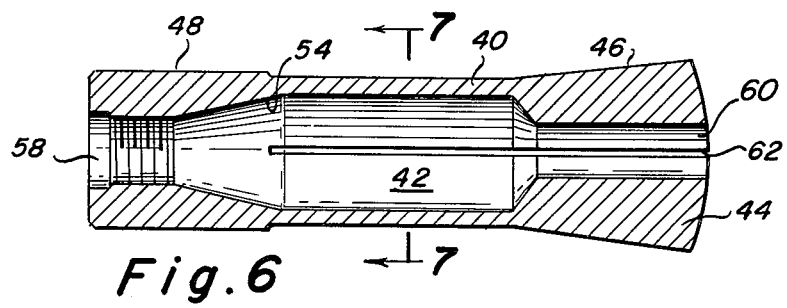
FIG. 6 is a longitudinal sectional view of a completed collet made in accordance with the present invention.
Figure 7:
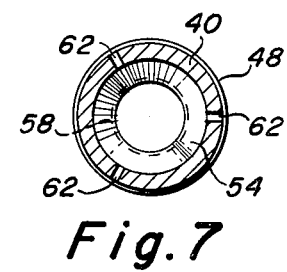
FIG. 7 is a sectional view taken along the line 7—7 of FIG. 6, looking in the direction of the arrows.
Figure 8:
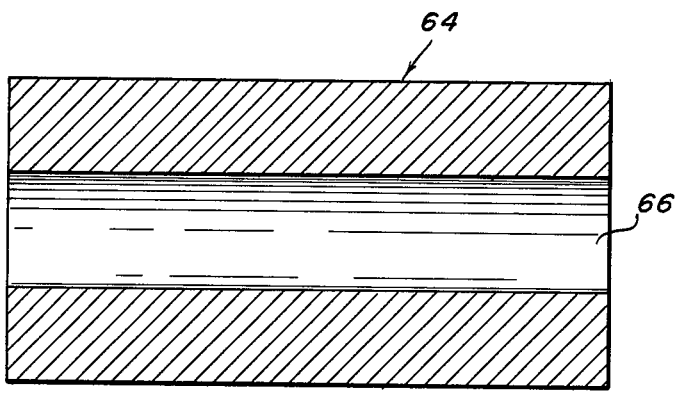
FIG. 8 is a longitudinal sectional view of a tubular blank of material for manufacturing a collet in accordance with a modified form of the present invention.

Referring now to FIGS. 6 and 7, manufacture of the collet is completed by threading bore 56 as indicated at 58, drilling an axial bore 60 through front portion 44 of reduced cross-sectional area as compared with bore 42, and forming a plurality of longitudinal slots 62 in the front and central portions to provide a plurality of resilient fingers or leaves in accordance with conventional practice. Referring to FIGS. 4 and 6, it will be seen that transitional area wall section 54 extends from a point just aft of longitudinal slots 62, and the resilient fingers or leaves formed thereby, to threaded bore 58. Accordingly, the normal function of either of these parts is not affected by the gradual decrease in the diameter of the longitudinal bore from the central portion to the rear portion of the collet.

Rear portion 48 has now been work hardened below the recrystallization temperature of metal by swaging or other process and the front and central portions of the collet are heat treated, thereby completing the manufacturing process.

Figure 12:
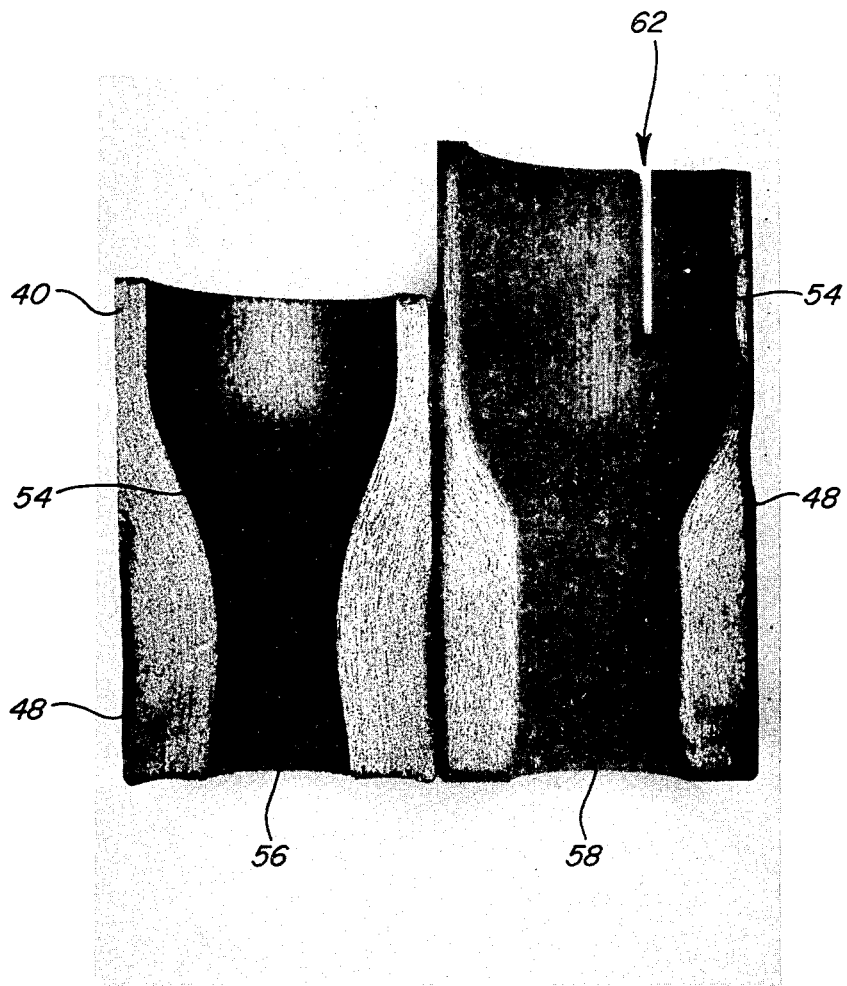
FIG. 12 is a macrograph of a portion of the collet made in accordance with the present invention illustrating the metallic flow lines thereof after swaging and after heat treatment.

Referring now to FIG. 12 of the drawings, there is illustrated a macrograph of the rear portion of two collets, the collet on the left illustrating a collet which has been cold worked by swaging and the collet on the right illustrating a collet which has been cold worked by swaging and then heat treated.

It will be noted from a consideration of FIG. 12 that by gradually decreasing the diameter of the longitudinal bore in the transitional area between the central and rear portions by means of a cold working process, there are no breaks or sharp line changes. Also, as clearly shown in FIG. 12, transitional area wall section 54 is characterized by close grain structure and a smooth, uniform grain flow with unbroken flow lines following the contour of the inner wall of the collet. As a result, the tensile strength of the entire draw bar end of the collet is increased by cold working. This further effects a smoother thread finish than has heretofore been possible and allows an easier and precisely centered pull by the draw bar on a collet with resultant tighter grip and with less run out of the tools held in the front hole.

The cold working of the rear portion of the collet further eliminates tool marks inside or outside of the collet, and finish grinding time is accordingly reduced. Tool mark stress risers are also eliminated which otherwise might result in cracks during heat treatment.

In FIGS. 8 to 11, there is illustrated a modified form of manufacturing a collet in accordance with the present invention. In accordance with this form of the invention, a cylindrical blank 64 is milled to provide an axial bore 66 extending therethrough. The wall of stock 64 is relatively thick in order to permit machining of the outer wall thereof to the shape shown in FIG. 9. The machined blank includes a front portion 68, a central portion 70 and a rear portion 72. It will be noted from a consideration of FIG. 9 that the wall of central portion 70 is relatively thin as compared to that of rear portion 72 and that the wall of front portion 68 is of substantially frusto-conical shape.

At the aft end of central portion 70, the wall of the blank is progressively and gradually thickened through a transitional area of approximately ¾ inch of the collet length to rear portion, the wall of which is approximately twice the thickness of the central portion wall.

Figure 9:
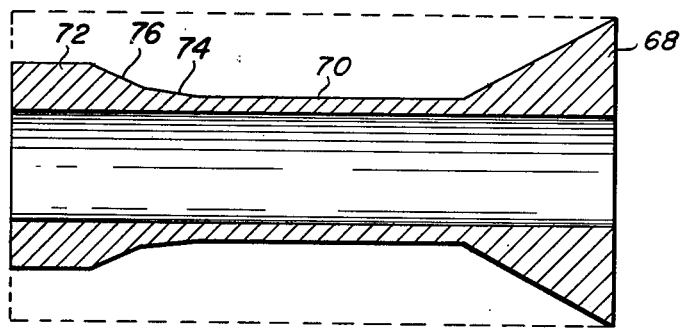
FIG. 9 is a view similar to FIG. 8 showing the blank after machining in accordance with the present invention.

As shown in FIG. 9, in the transitional area between central portion 70 and rear portion 72, the gradual increase in wall thickness is effected by means of a first peripheral, angular wall section 74, the outer surface of which extends outwardly and rearwardly at approximately a 5° angle to the outer wall surface of central portion 70. Peripheral, angular wall section 74 issues into a second peripheral, angular wall section 76, the outer surface of which extends outwardly and rearwardly at approximately a 20° angle to the wall of central portion 70.

Figure 10:
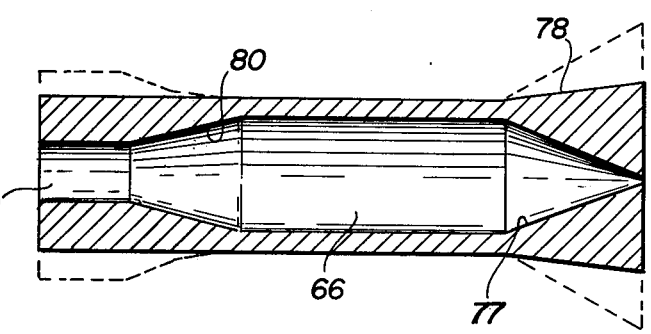
FIG. 10 is a view similar to FIGS. 8 and 9, wherein the front and rear portions of the blank have been cold worked in accordance with the present invention.
Figure 11:
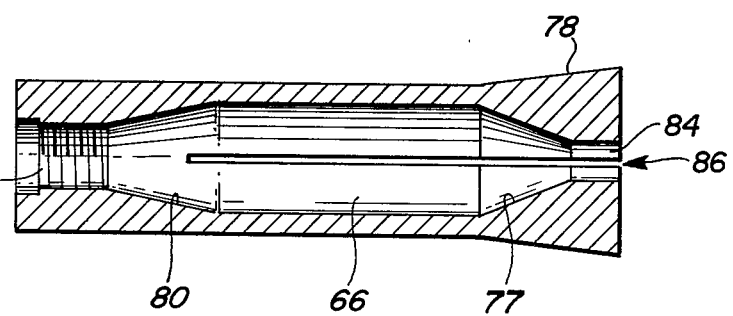
FIG. 11 is a longitudinal sectional view of a completed collet constructed in accordance with the modified form of this invention.

In accordance with this form of the invention, both the front and rear portions 68 and 72 are cold worked by swaging, drawing or other process to reshape the machined blank to the form shown in FIG. 10. After cold working, bore 66 at the forward end of central portion 70 gradually and progressively tapers inwardly and forwardly as indicated at 77, and the outer surface is shaped to provide a camming surface 78.

Rear portion 72 and transitional wall sections 74 and 76 are cold worked until the outer diameter of the rear portion is approximately the same as that of central portion 70, as illustrated in FIG. 10.

The thickness of the wall of the collet in the angular transitional area between the central and rear portion is thereby progressively and gradually increased to provide an angular wall section 80 extending for ¾ inch of the collet length, the inner surface of which extends inwardly and rearwardly at approximately a 20° angle to the wall of central portion 70. Correspondingly, the diameter of the bore in the transitional area is progressively and gradually reduced. Beyond the transitional area, a longitudinal bore 82 extends through rear portion 72, which bore is of substantially smaller cross-sectional area than bore 66.

Manufacture of the collet is completed by drilling a work-holding longitudinal bore 84 at the forward end of front portion 68, machining a plurality of longitudinal slots 86 in the front and central portions to provide fingers or leaves, and threading bore 82 as indicated at 88. The collet is then heat treated for hardness as set out above in connection with the form of invention illustrated in FIGS. 2 through 7.

The collet illustrated in FIGS. 8 to 11, and manufactured in accordance with the present process, possesses the same characteristics of both the front and rear transitional areas as set out above in connection with the form of invention of FIGS. 2 to 7. Accordingly, the transitional areas between central portion 70 and rear and front portions 68 and 72 which have been cold worked, results in a uniform flow of metal in these areas which increases the tensile strength of the collet, and increases the fatigue life of the collet.

While there has been herein shown and described the presently preferred form of this invention, it is to be understood that such has been done for purposes of illustration only, and that various changes may be made therein within the scope of the appended claims.

What is claimed is:

1. A one-piece collet comprising:
   (a) an elongated body having rear, central and front portions of solid metallic construction, said front portion having a frusto-conical camming surface,
   (b) said rear, central and front portions having a longitudinal bore extending therethrough, the diameter of the longitudinal bore extending through said central portion being substantially greater than the diameter of the rear portion bore, and the wall thickness of the rear portion being substantially greater than the wall thickness of the central portion,
   (c) the front and central portions of said body being provided with a plurality of spaced, longitudinal slots forming resilient leaves,
   (d) the bore of said rear portion being threaded for engagement with a draw bar,
   (e) the wall thickness of said elongated body in the transitional area between the rear and central portions being progressively and gradually thickened from a point just aft of the longitudinal slots of the central portion to the inner end of the threaded bore of said rear portion,
   (f) the rear portion of said body being cold worked, whereby the transitional area between said rear and central portions is characterized by smooth uniform grain flow lines, thereby providing a collet of increased tensile strength at the rear portion.

2. The one-piece collet of claim 1, wherein:
   (a) the inner surface of the wall of said elongated body in the transitional area extends at an angle of approximately 20° with respect to the wall of said central portion.

3. The one-piece collet of claim 1, wherein:
   (a) the central and front portions of said body are characterized by heat treated structure.

4. The one-piece collet of claim 1, wherein:
   (a) the rear portion of said body is characterized by a swaged structure.

5. The one-piece collet of claim 1, wherein:
   (a) the rear portion of said body is characterized by a drawn structure.

6. A one-piece collet comprising:
   (a) an elongated body having rear, central and front portions of solid unitary metal construction, the front portion having a frusto-conical camming surface
   (b) said rear, central and front portions having a longitudinal bore extending therethrough, the diameter of the longitudinal bore extending through said central portion being substantially greater than the diameter of the front and rear portion bores, and the wall thickness of the front and rear portions being substantially greater than the wall thickness of the central portion
   (c) the front and central portions of said body being provided with a plurality of spaced, longitudinal slots forming resilient leaves
   (d) the bore of said rear portion being threaded for engagement with a draw bar
   (e) the wall thickness of said elongated body in the transitional area between the rear and central portions being progressively and gradually thickened from a point just aft of the longitudinal slots of the central portion to the inner end of the threaded bore of said rear portion
   (f) the rear portion of said body being cold worked, whereby the transitional area between said rear and central portions is characterized by smooth uniform grain flow lines, thereby providing a collet of increased tensile strength at the rear portion
   (g) the inner surface of the wall of said elongated body in the transitional area between the central and rear portions extending inwardly and rearwardly at an angle of approximately 20° with respect to the wall of said central portion for approximately ¾ inch of the collet's length.

7. The collet of claim 6, wherein
   (a) the rear portion of said body is characterized by a swaged structure.

8. The collet of claim 6, wherein
   (a) the rear portion of said body is characterized by a drawn structure.

9. The collet of claim 6, wherein
   (a) the central and front portions of the body are characterized by heat treated structure.

* * * * *